United States Patent [19]
Sato

[11] 3,812,502
[45] May 21, 1974

[54] EXPOSURE CONTROL CIRCUIT FOR TTL CAMERA

[75] Inventor: Takayoshi Sato, Tokyo, Japan

[73] Assignee: Kabushiki-Kaisha Copal, Tokyo, Japan

[22] Filed: Jan. 29, 1973

[21] Appl. No.: 327,798

Related U.S. Application Data

[63] Continuation-in-part of Ser. No. 63,214, Aug. 12, 1970, abandoned.

[30] Foreign Application Priority Data

Aug. 18, 1969 Japan.............................. 44-65423
Oct. 2, 1969 Japan.............................. 44-78775
Oct. 27, 1969 Japan.............................. 44-85228

[52] U.S. Cl. ................................................. 354/51
[51] Int. Cl. ............................................. G03b 7/08
[58] Field of Search ............................. 95/10 CT

[56] References Cited
UNITED STATES PATENTS
3,324,779  6/1967  Noluesawa et al. .............. 95/10 CT
3,353,462  11/1967  Suzuki .............................. 95/10 CT
3,533,348  10/1970  Yanagi .............................. 95/10 X

*Primary Examiner*—Samuel S. Matthews
*Assistant Examiner*—Michael L. Gellner
*Attorney, Agent, or Firm*—Hans Berman

[57] ABSTRACT

An automatic exposure circuit for a TTL camera. The circuit includes an integrating circuit having a capacitor and a light-sensitive resistor connected in series to a source of potential. The time taken to charge the capacitor, a function of scene illumination, in turn determines the magnitude of the charge stored, or "memorized," in a second capacitor in a memory circuit. Actuation of the shutter release starts the charging of a third capacitor in an exposure control circuit and when the voltage across the third capacitor equals the potential "memorized" in the second capacitor, the shutter blades are permitted to close. In other embodiments of the invention, light-sensitive resistors are included in the charging circuits of the second and third capacitors to compensate for any change in scene illumination which might occur after the shutter release mechanism is depressed.

7 Claims, 14 Drawing Figures

INTEGRATING CIRCVIT | MEMORY and EXPOSVRE CONTROL CIRCVIT | OVTPVT CIRCVIT | ELECTRIC SOVRCE

INVENTOR.
Takayoshi Sato
BY Kelman and Berman
Agents

EXPOSURE CONTROL CIRCUIT FOR TTL CAMERA

CROSS REFERENCE TO RELATED APPLICATION

This application is a continuation-in-part of applicant's copending application, Ser. No. 63,214, filed Aug. 12, 1970, for "Method for Automatically Determining the Proper Exposure Time of an Electronic Shutter of a TTL Type Photographic Camera and the Electronic Shutter for Carrying Out the Method" which application is assigned to the assignee of the instant invention, and is now abandoned.

BACKGROUND OF THE INVENTION

The present invention relates to a method for automatically determining the proper exposure time of an electric shutter incorporated in a photographic camera in which the light from an object is measured for controlling the exposure time after it passes through an objective lens of said camera and the electronic shutter for carrying out the method described above.

In a prior art photographic camera of the so-called TTL system in which the light from the object is measured by a photoelectric element for controlling the exposure time of the camera after the light passes through the objective lens of the camera, a conventional electronic shutter cannot be used in the camera by locating the photoelectric element incorporated in the shutter behind the objective lens so as to receive the light after passing therethrough, because the reflecting mirror located behind the objective lens for directing the light from the object passing through the objective lens to a finder of the camera for the viewing of the object must be moved out of the optical path of the objective lens for the exposure of the photosensitive material loaded in the camera together with the photoelectric element, so that the light is no more supplied to the photoelectric element, thereby resulting in a rapid increase in the resistance of the photoelectric element which makes it impossible to properly control the exposure time by the electronic shutter for the proper exposure time.

Therefore, it is required to memorize the intensity of light from the object by some means prior to the exposure of the photosensitive material in order to make it possible to automatically determine the proper exposure time of the electronic shutter incorporated in the above-described TTL type photographic camera in which the photoelectric element of the shutter is located behind the objective lens so as to receive the light after passing therethrough.

In memorizing the intensity of light from the object for obtaining the proper exposure time by means of an electronic shutter incorporated in a TTL type photographic camera, however, the exposure time might deviate from the proper exposure time when the intensity of light varies after the shutter blades are opened for the exposure because the memorization of the intensity of light must be completed prior to the opening of the shutter blades, i.e., the movement of the reflecting mirror out of the optical path of the objective lens together with the photoelectric element of the electronic shutter.

Therefore, it is required to obtain the proper exposure time regardless of the variation in the intensity of light after the shutter blades are opened.

The present invention aims at solving the above-described requirements.

SUMMARY OF THE INVENTION

An object of the present invention is to provide a novel and useful method for automatically determining the proper exposure time of an electronic shutter incorporated in a TTL type photographic camera.

Another object is to provide a novel and useful method for automatically determining the proper exposure time of an electronic shutter incorporated in a TTL type photographic camera by which the proper exposure time is obtained regardless of the variation in the intensity of light during the exposure, i.e., after the shutter blades are opened.

A further object of the present invention is to provide a novel and useful electronic shutter to be incorporated in a TTL type photographic camera for carrying out the above-described objects.

The objects of the present invention are achieved by electrically charging a capacitor in an integrating circuit in the electronic shutter having a photoelectric element connected to the capacitor which is adapted to receive the light from the object after it passes through the objective lens of the camera so that the resistance of the photoelectric element varies in accordance with the intensity of light incident thereto, thereby permitting the capacitor to be charged at a rate determined by the varied resistance of the photoelectric element to determine a reference time period indicative of the intensity of the light incident to the objective lens, charging or discharging a capacitor in a memory circuit connected to the integrating circuit and having a resistor connected to the capacitor in the memory circuit for the time determined by the above reference time period simultaneously with the charging of the capacitor in the integrating circuit so as to store an electric charge in the capacitor in the memory circuit the voltage of which is indicative of the above reference time period, charging or discharging a capacitor in an exposure control circuit connected to the memory circuit and having a resistor connected to the capacitor in the exposure control circuit simultaneously with the opening of shutter blades of the electronic shutter so that the voltage of the electric charge in the capacitor is varied as the same is charged or discharged, comparing the varying voltage of the capacitor in the exposure control circuit with the voltage of the electric charge stored in the capacitor in the memory circuit, and actuating a switching circuit connected to the exposure control circuit when the voltage of the capacitor in the exposure control circuit reaches the voltage of the electric charge stored in the capacitor in the memory circuit so as to actuate shutter blade closing means in the electronic shutter connected to the switching circuit thereby permitting the shutter blades to be closed for the proper exposure.

In accordance with a feature of the present invention, the resistor in each of the memory circuit and the exposure control circuit is replaced by a photoelectric element adapted to receive the light from the object directly without passing through the objective lens so that the proper exposure time is obtained regardless of the variation in the intensity of light during the exposure by the shutter, while the memory circuit can be operated in a wide range of the variation in the intensity of the light by virtue of the photoelectric element provided in the memory circuit through which the capacitor in the memory circuit is charged or discharged.

In accordance with a further feature of the present invention, the photoelectric element in the memory circuit may be commonly used as the photoelectric element in the exposure control circuit by switching the connection thereof from the memory circuit to the exposure control circuit simultaneously with the opening of the shutter blades thereby permitting the tolerance in accuracy of the photoelectric elements used in the memory circuit and the exposure control circuit to be disregarded.

The charging or discharging of the capacitor of the memory circuit may be commenced in coupled relationship with the first part of the operation of a shutter releasing means of the electronic shutter prior to the opening of the shutter blades, and the shutter blades are opened by the last part of the operation of the shutter releasing means simultaneously with the charging or discharging of the capacitor in the exposure control circuit.

DETAILED DESCRIPTION OF THE PREFERRED EMBODIMENT

Figure 1:
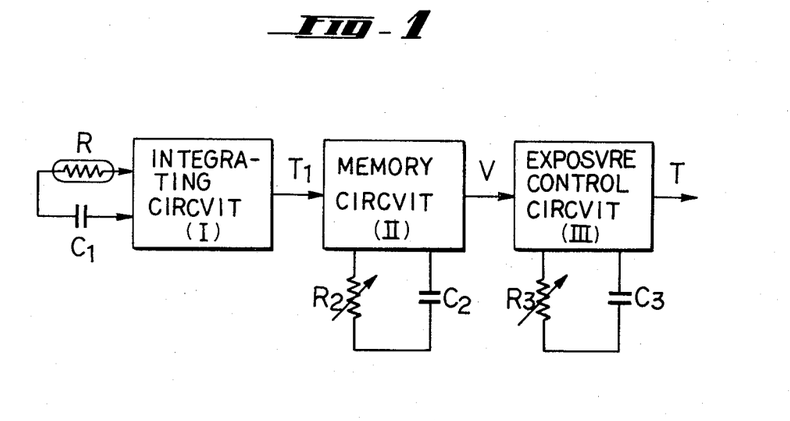
FIG. 1 is a block diagram showing schematically the main part of the construction of the first embodiment of the electronic shutter of the present invention.

Referring to FIG. 1, the electronic shutter of the present invention comprises an integrating circuit I having a capacitor $C_1$ and a photoelectric element R connected in series thereto, a memory circuit II having a capacitor $C_2$ and a variable resistor $R_2$ connected in series thereto, and an exposure control circuit III having a capacitor $C_3$ and a variable resistor $R_3$. The photoelectric element R receives the light from the object after passing through the objective lens of the camera and the resistance of the photoelectric element R varies in accordance with the intensity of light incident thereto. Therefore, a reference time $T_1$ proportional to the time constant $R_1C_1$ of the charging or discharging circuit consisting of the photoelectric element R whose instantaneous resistance is $R_1$ and the capacitor $C_1$ is obtained by the integrating circuit I when the same is actuated by the first part of the operation of the shutter releasing means of the camera. The capacitor $C_2$ of the memory circuit is charged or discharged through the resistor $R_2$ simultaneously with the actuation of the integrating circuit for the time determined by the reference time $T_1$ so that an electric charge is stored, the voltage V of which corresponds to the reference time $T_1$, i.e., the voltage V is indicative of the intensity of light received by the objective lens. The capacitor $C_3$ in the exposure control circuit III is charged or discharged through the resistor $R_3$ simultaneously with the opening of shutter blades effected by the last part of the operation of the shutter releasing means so that the voltage of the electric charge in the capacitor $C_3$ varies as the charging or discharging thereof proceeds.

The voltage of the capacitor $C_3$ is compared with the voltage of the capacitor $C_2$ and a switching circuit in the electronic shutter (not shown) is actuated when the voltage of the capacitor $C_3$ reaches the voltage of the capacitor $C_2$. The switching circuit is connected to a shutter blade closing means such as an electromagnet in the shutter (not shown) so that the shutter blades are closed when the switching circuit is actuated. Since the time period T from the commencement of the charging or discharging of the capacitor $C_3$, i.e., the commencement of the opening of the shutter blades until the switching circuit is actuated, i.e., the shutter blades are closed, depends upon the voltage V of the electric charge stored in the capacitor $C_2$ which in turn corresponds to the reference time $T_1$ indicative of the intensity of light received by the objective lens, the proper exposure of the photosensitive material in the camera is achieved by appropriately selecting the characteristics of the elements in the electronic shutter. Adjustment for the different sensitivity of the photosensitive material can be effected by appropriately adjusting the variable resistors $R_2$ and $R_3$.

Figure 2:
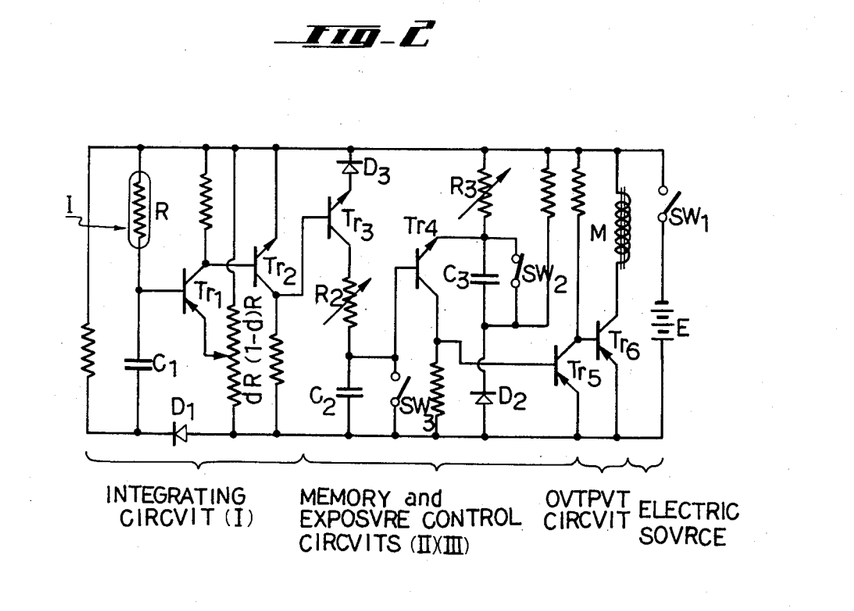
FIG. 2 is a diagram showing the electric circuit of the electronic shutter of FIG. 1.

An embodiment of the electric circuit of the present invention is shown in FIG. 2. The electric circuit comprises integrating circuit I consisting of capacitor $C_1$, photoelectric element R, transistors $Tr_1$ and $Tr_2$, and resistors $dR$, $(1-d)R$, memory and exposure control circuits II, III consisting of capacitor $C_2$, variable resistor $R_2$, transistor $Tr_3$, and diode $D_3$, transistors $Tr_4$ and $Tr_5$, capacitor $C_3$, variable resistor $R_3$ and diode $D_2$, an output circuit consisting of transistor $Tr_6$ and shutter blade closing means such as an electromagnet M, and an electric source E connected as shown in FIG. 2. Electromagnet M is so arranged in the conventional manner that, when it is energized, it actuates shutter blade holding means so that the shutter blades are maintained in their opened state, while the shutter blade holding means is released to close the shutter blades when electromagnet M is deenergized. Switch $SW_1$ is connected to electric source E so as to open and close the circuit. Switches $SW_2$ and $SW_3$ are connected in parallel to the respective capacitors $C_2$ and $C_3$. Photoelectric element R is adapted to receive the light from the object after passing through the objective lens.

In operation, switch $SW_1$ is first closed in coupled relation to the first part of the operation of shutter releasing means to supply the electric power to the circuit and switch $SW_2$ is closed. Switch $SW_3$ is for discharging the electric charge in capacitor $C_2$ and it is opened prior to the closing of switch $SW_1$ after capacitor $C_2$ has been fully discharged. Since a bridge circuit is formed by photoelectric element R, capacitor $C_1$, resistor $dR$ ($d$ being a constant which is adjustable for the sensitivity of the photosensitive material or for the measurement using a present diaphragm adjusting means), resistor $(1-d)R$ R and detecting transistor $Tr_1$, resistance $R_1$ of photoelectric element R varies in accordance with the intensity of light incident thereto, so that transistors $Tr_1$, $Tr_2$ are rendered to be non-conductive while transistor $Tr_3$ is made conductive for the time period $T_1 = R_1 C_1 ln(1/1-d)$. Thus, capacitor $C_2$ is charged through resistor $R_2$ for the time period $T_1$. The voltage $Vc_2$ of the charge thus stored in capacitor $C_2$ is represented by the following equation:

$$Vc_2 = (V_0 - V_D)(1 - e^{-T_1/R_2 C_2}) \quad (1)$$

where:
$V_D$ = the voltage of diode $D_3$ in the due direction (including the saturated collector-emitter voltage $V_{CE}$ of transistor $Tr_3$)
$V_0$ = the voltage of electric source E.

The emitter of transistor $Tr_4$ is connected to diode $D_2$ through switch $SW_2$ so that it is inversely biased even after transistor $Tr_3$ is rendered to be non-conductive after the lapse of time period $T_1$. Therefore, the voltage of capacitor $C_2$ does not vary and is kept at voltage $Vc_2$. When transistor $Tr_3$ is made non-conductive, transistors $Tr_1$, $Tr_2$ are kept conductive, because the voltage of capacitor $C_1$ approaches that of the negative terminal of electric source E even though the resistance of photoelectric element R is varied by the movement thereof together with the reflecting mirror out of the optical path. Thus, the time period $T_1$ is memorized in terms of the terminal voltage $Vc_2$ of capacitor $C_2$ which serves as the reference voltage indicative of the intensity of light passing through the objective lens.

In the succeeding portion of the operation of the shutter releasing means, triggering switch $SW_2$ is opened in coupled relation with the opening of shutter blades. Then, capacitor $C_3$ is charged through resistor $R_3$ and the voltage of the emitter of transistor $Tr_4$ approaches that of the negative terminal of electric source E. The terminal voltage $Vc_3$ of capacitor $C_3$ is represented by the following equation:

$$Vc_3 = (V_0 - V_D)(1 - e^{-T/R_3 C_3}) \quad (2)$$

wherein:
$V_D$ = the voltage of diode $D_2$ in the due direction (assuming that the voltage of $D_2$ is equal to that of $D_3$)

Since the base voltage of transistor $Tr_4$ is kept at voltage $Vc_2$, transistors $Tr_4$, $Tr_5$ are made non-conductive while transistor $Tr_6$ is rendered to be conductive until voltage $Vc_3$ reaches voltage $Vc_2$. Therefore, electromagnet M is energized to maintain the shutter blades in the opened state.

The time T at which $Vc_3$ reaches $Vc_2$ is obtained by the previous equations (1), (2) as follows:

$(V_0 - V_D)(1 - e^{-T_1/R_2 C_2}) = (V_0 - V_D)(1 - e^{-T/R_3 C_3})$ ∴ $T/R_3 C_3 = T_1/R_2 C_2$ ∴ $T = (R_3 C_3/R_2 C_2)$
$T_1 = (R_3 C_3/R_2 C_2) R_1 C_1 ln 1/1-d$

By making $R_3 C_3/R_2 C_2$ to be 1, T is made equal to $T_1$.

Figure 3:
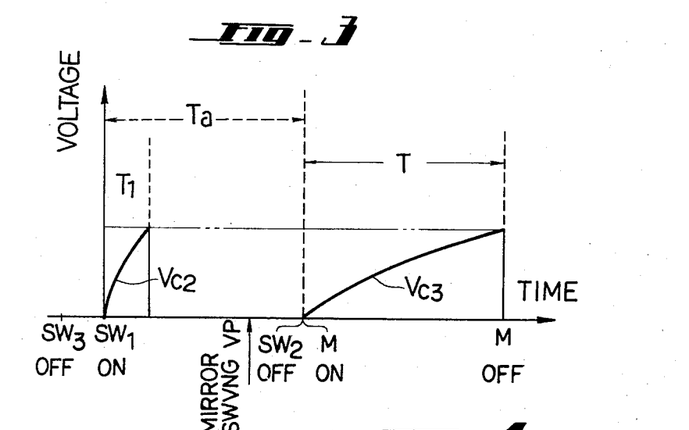
FIG. 3 is a diagram showing the relationship between the voltage of the electric charge in the capacitors of the electronic shutter of FIG. 1 and the time elapsed after the actuation of the shutter releasing means.

However, the time period Ta (FIG. 3) beginning at the commencement of the operation of the releasing means and ending at the commencement of the opening of the shutter blades, i.e., the opening of switch $SW_2$, must be greater than time period $T_1$ in order to obtain the exact time period $T_1$. Assuming $Ta = 1$ second, the value $R_3 C_3/R_2 C_2$ must be selected to be greater than 10 in order to obtain the actual exposure time T of 10 seconds. Therefore, the value $R_3 C_3/R_2 C_2$ is determined in consideration of the maximum exposure time.

Diodes $D_1$, $D_2$ and $D_3$ are necessary when silicon transistors are used as transistors $Tr_1$, $Tr_2$ and $Tr_3$. They serve to compensate for the base-emitter voltage $V_{BE}$ of the transistors while they serve to eliminate the dependence of time period $T_1$ and T upon the voltage.

As previously described, resistors $R_2$, $R_3$ may be adjusted for the different sensitivity of the photosensitive material or for the measurement using a preset diaphragm regulating means in which measurement the diaphragm is fully opened.

When voltage $Vc_3$ reaches voltage $Vc_2$, transistors $Tr_4$, $Tr_5$ are rendered to be conductive and transistor $Tr_6$ is made non-conductive so that electromagnet M is deenergized to release the shutter blade holding means, thereby closing the shutter blades for the proper exposure.

The operation of applicant's invention, as above-described, differs significantly from the prior art, as typified, for example, in U.S. Pat. No. 3,324,779 to Nobusawa et al., particularly FIG. 6 thereof.

As described above, the relationship between the actual exposure time T and the resistance of the photoelectric element R may be expressed as follows:

$$T = Ka \cdot R \quad (I)$$

where $K_a$ is a constant. Thus, the exposure time T in the instant invention is simply inversely proportional to the brightness of the object, a relationship that is not true in the prior art.

For example, in the above-referenced U.S. Pat. No. 3,324,779, particularly FIG. 6, prior to operation of the shutter, the switch 32 is connected as shown in the drawing to charge capacitor 33 to a voltage $V_{33s}$ which is equal to $V_{31}$, the voltage of the electric source 31, i.e., $$V_{33s} = V_{31} \quad (II)$$

In the memorizing operation, prior to photographing an object, switch 32 is switched to the lower position so that capacitor 33 continues to be discharged until transistor 39 is switched from a conductive state to a non-conductive state, thereby permitting the remaining charge to be kept in capacitor 33. The time period until transistor 39 is rendered non-conductive, i.e., the memorization time Tm, is determined by the resistance value $R_{34}$ of the photoelectric element 34 and the capacity value $C_{35}$ of capacitor 35, thus $$Tm = K_1 \cdot R_{34} \cdot C_{35} \quad \text{(III)}$$

where $K_1$ is constant.

The voltage $V_{33m}$ of the remaining charge in capacitor 33, after the lapse of the memorization time Tm, is $$V_{33m} = V_{31} e^{-Tm/C_{33}(R_{38}+R_{101})} \quad \text{(IV)}$$

where, $C_{33}$ is the capacity of capacitor 33
$R_{38}$ is the resistance of resistor 38, and
$R_{101}$ is the resistance of the collector resistor of transistor 39.

Therefore, the voltage $V_{33m}$, as shown by equation (IV), is memorized in capacitor 33 as information pertaining to the object to be photographed, before the photographing operation is commenced.

At the beginning of the photographing operation, switch 40 is switched to the closed position so that capacitor 42 commences to be charged. Assuming now that the input impedance of transistor 49 is very high, so the input current is essentially zero, and the collector current of transistor 49 is $I_{42E}$, then $$I_{42E} = K_2 \cdot V_{33m} \quad \text{(V)}$$

where $K_2$ is constant.

As capacitor 42 is charged and the voltage thereof reaches a certain fixed reference voltage $V_r$, transistors 49, 45 are made non-conductive and transistor 46 is made conductive so as to actuate relay 43 to close the camera shutter, thus assuming proper exposure.

Assuming that the time period between the switching of switch 40 to the closed position and the switching of transistor 49 to a non-conductive state, i.e., the exposure time, to be $T_E$, then the voltage $V_{42E}$ of capacitor 42 existing at the lapse of the exposure time $T_E$ is, $$V_{42E} = I_{42E} \cdot T_E/C_{42} \quad \text{(VI)}$$

where $C_{42}$ is the value of capacitor 42.

At this time, the voltage $V_{42E}$ is equal to the reference voltage $V_r$, thus $$V_{42E} = V_r = I_{42E} \cdot T_E/C_{42}$$
$$\therefore T_E = C_{42} \cdot V_r/I_{42E} \quad \text{(VII)}$$

By introducing equations (II) to (VI) into equation (VII), the following equation is obtained:

$$T_E = \frac{C_{42} \cdot V_r}{K_2 \cdot V_{31}} \cdot \frac{1}{e^{-\frac{C_{35} \cdot K_1 \cdot R_{34}}{C_{33}(R_{38}+R_{101})}}} \quad \text{(VIII)}$$

Let us assume that
$C_{42} \cdot V_r/K_2 \cdot V_{31} = \text{constant} = \alpha$
$C_{35} \cdot K_1/C_{33}(R_{38}+R_{101}) = \text{constant} = \alpha$ Thus, equation (VIII) can be written as follows:

$$T_E = \alpha \cdot e^{\beta \cdot R_{34}} \quad \text{(IX)}$$

where $\alpha > 0$, $\beta > 0$.

As is clear from the above, the exposure time $T_E$ of a typical prior art circuit as typified by U.S. Pat. No. 3,324,779 is an exponential function with respect to the brightness of the object, as represented by $R_{34}$.

Figure 14:
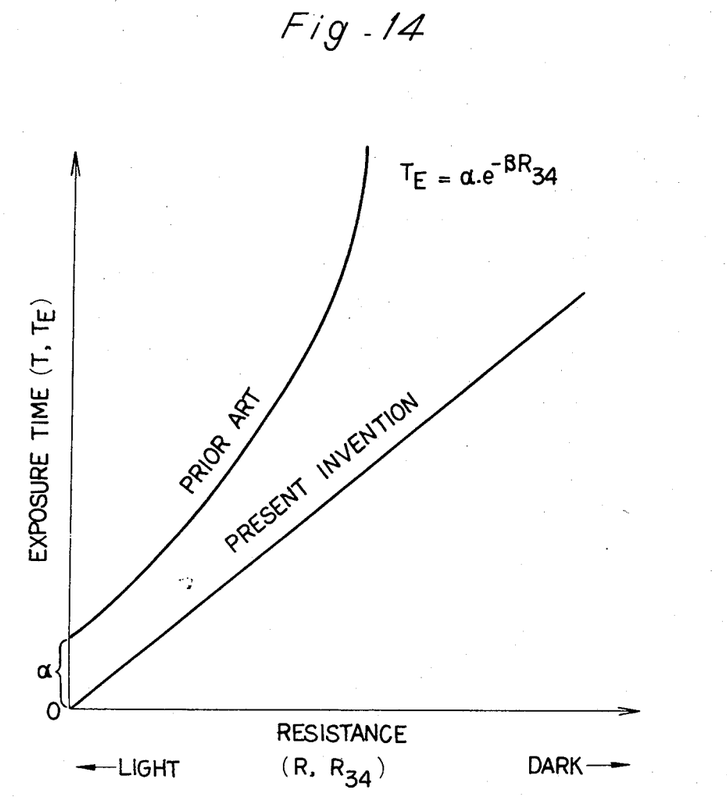
FIG. 14 is a graph comparing the operation of applicant's invention to the prior art.

FIG. 14 shows the relation between the exposure time and the resistance value of photoelectric element for both the instant invention and the prior art circuitry. As is clear from the diagram, the curve of the prior art circuitry is non-linear and the curve does not pass through the origin O, whereas the curve of applicant's invention passes through the origin O and is linear, i.e., the exposure time is inversely proportional to the brightness of the object being illuminated.

In the prior art, exposure time is not proportional to brightness, thereby making it difficult to obtain a proper exposure time. Since in the prior art the time $\alpha$ remains, even though $R_{34} = 0$, it is necessary to provide some compensation means so that the curve $T_E$ is made to pass through the origin O. However, such compensation cannot be obtained by merely varying the circuit constants and no measures are available to achieve the above compensation other than relying upon adjustment of the time at which the switch is switched. Such an adjustment is, however, extremely difficult to achieve, thereby making control by the prior art devices somewhat inaccurate.

Figure 4:
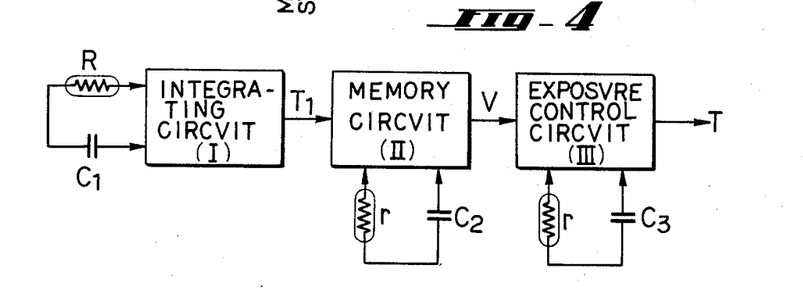
FIG. 4 is a block diagram similar to FIG. 1 but showing the main part of the construction of the second embodiment of the electronic shutter of the present invention.

FIG. 4 shows a modification of the shutter of FIGS. 1 and 2, in which photoelectric elements r of the same characteristics are provided in place of resistors $R_2$, $R_3$ in FIGS. 1 and 2, respectively. Photoelectric elements r are adapted to receive the light from the object directly without passing through the objective lens.

In the shutter shown in FIGS. 1 and 2, the proper exposure time cannot be obtained when the intensity of light varies during the time the shutter blades are opened, because the reference time period $T_1$ is memorized prior to the opening of the shutter blades and no measures are provided to compensate for the variation in the intensity of light during the opening of the shutter blades.

The shutter shown in FIG. 4 removes the above deficiency by the provision of photoelectric elements r in place of resistors $R_2$, $R_3$ in FIG. 2.

Referring to FIG. 4, reference time period $T_1$ obtained by integrating circuit I is represented by the following equation provided that $R_1$ is not varied during the time period $T_1$:

$$T_1 = K_1 R_1 C_1 \quad (3)$$

where:
$R_1$ = the resistance of photoelectric element R
$K_1$ = a constant

On the other hand, time period $T_1$ can be represented by the following equation:

$$T_1 = R_1 C_1 \ln V_0/V_{0-}V' \quad (4)$$

where:

$V_0$ = the voltage of the electric source applied to capacitor $C_1$ through resistance $R_1$ of photoelectric element R $V'$ = the voltage of the electric charge in capacitor $C_1$ charged or discharged for the time period $T_1$.

Therefore, the value of $K_1$ is equal to $ln\ V_0/V_0 - V'$ or it may be thought as a constant of a monostable circuit.

In memory circuit II, the following relation exists:

$$T_1 = r_2 C_2 ln\ V_0/V_0 - V \quad (5)$$

where:

$r_2$ = the resistance of photoelectric element r in memory circuit II $V$ = the voltage of the electric charge in capacitor $C_2$ charged or discharged for the time period $T_1$.

Similarly, the following relation exists in exposure control circuit III:

$$T = r_3 C_3 ln\ V_0/V_0 - V \quad (6)$$

where:

$r_3$ = the resistance of photoelectric element r in exposure control circuit III.

From the above equations (3), (4), (5), $ln\ V_0/V_0 - V = R_1 r_2 \cdot C_1/C_2\ K_1$ or $ln\ V_0/V_0 - V = R_1/r_2 \cdot C_1/C_2\ ln\ V_0/V_0 - V' \quad (7)$ Since each of $R_1$ and $r_2$ is the resistance appearing in the respective photoelectric element R or r simultaneously receiving the same intensity of light, the value of $r_2$ is proportional to the value of $R_1$.

Therefore, $$R_1/r_2 = N \quad (8)$$

where:

$N$ = a constant.

Thus, the equation (7) is represented:

$ln\ V_0/V_0 - V = N \cdot C_1/C_2\ K_1$ or $ln\ V_0/V_0 = V = N \cdot C_1/C_2\ ln\ V_0/V_0 - V' \quad (9)$ From equations (9) and (6), $T = r_3 \cdot N \cdot C_1 C_3/C_2 \cdot K_1$ or $$T = r_3 N\ C_1 C_3/C_2\ ln\ V_0/V_0 - V' \quad (10)$$

If the intensity of light during the memorization of time period $T_1$ is equal to that during the exposure, then $r_3 = r_2 = 1/N\ R_1$.

Thus, $T = R_1\ C_1 C_3/C_2\ K_1$ or $$T = R_1\ C_1 C_3/C_2\ ln\ V_0/V_0 - V' \quad (11)$$

Equation (11) shows that the exposure time T corresponds to the intensity of light from the object passing through the objective lens and this can be utilized in a conventional electronic shutter in which no memory circuit is provided.

On the other hand, if the intensity of light varies during the exposure from that existing during the memorization of time period $T_1$, exposure time T varies in inverse proportion to resistance $r_3$ regardless of the variation in the intensity of light after the memorization of time period $T_1$ has been completed. In other words, assuming that the intensity of light during the memorization of the reference time period $T_1$ is $B_1$ and the resistance of photoelectric element R and that of photoelectric element r in memory circuit II are $R_1$ and $r_2$, respectively, and the intensity of light is varied to $\alpha B_1$ during the exposure by the shutter, the resistance $r_3$ of photoelectric element r in exposure control circuit III is $1/\alpha \cdot r_2$, because the resistance of photoelectric element r varies in inverse proportion to the intensity of light incident thereto. Assuming that the exposure time T is $T\alpha$ when the intensity of light during the exposure is $\alpha B_1$, exposure time $T\alpha$ is represented by the following equation derived from the equation (10):

$$T\alpha = 1/\alpha\ r_2 \cdot N\ C_1 C_3/C_2\ K_1 \quad (12)$$

On the other hand, if the intensity of light during the exposure remains the same value $B_1$ as that during the memorization of the reference time period $T_1$ and the exposure time is $T_{B1}$ under the condition of the intensity of light $B_1$, then $r_3 = r_2$ and the exposure time $T_{B1}$ is represented by the following equation derived from equation (10):

$$T_{B1} = r_2 N\ C_1 C_3/C_2\ K_1 \quad (13)$$

From equations (12) and (13), $T\alpha = 1/\alpha\ T_{B1}$

That is, when the intensity of light is magnified by $\alpha$ times during the exposure from that during the memorization of the reference time $T_1$, then the exposure time is made $1/\alpha$ times the exposure time obtained if the intensity of light were not varied. This means that, by the provision of the photoelectric element in each of the memory and exposure control circuit, the proper exposure time is obtained regardless of the variation in the intensity of light during the exposure.

In accordance with the feature of the present invention, the photoelectric element in the memory circuit may be commonly used as the photoelectric element in the exposure control circuit by switching the connection thereof from the memory circuit to the exposure control circuit.

Another advantage obtained by the provision of the photoelectric element in each of the memory and the exposure control circuit in accordance with the present invention is that a wide range of the variation in the intensity of light can be memorized to obtain the proper exposure time.

Figure 5:
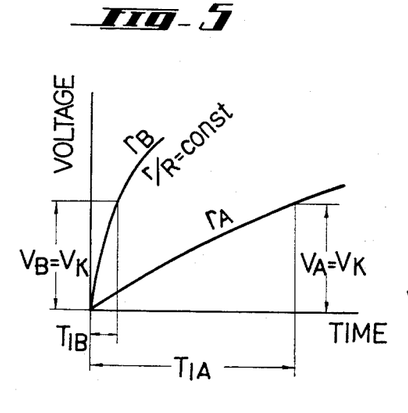
FIG. 5 is a diagram showing the charging characteristics of the capacitor in the memory circuit in which a fixed resistor is used.

Referring to FIG. 5 showing the charging characteristics of capacitor $C_2$ in memory circuit II in which no photoelectric element is provided, the charged voltage V is determined by the equation (5).

Assuming that the reference voltage $V_1$ is made $T_{1B}$, $T_{1A}$ when the intensity of light is B and A, respectively, and the voltage of the electric charge in capacitor $C_2$ charged during the time $T_{1B}$, $T_{1A}$ is $V_B$, $V_A$, respectively, the value of the voltage V varies with respect to the value of time period $T_1$ along a characteristic curve which is determined by a fixed time constant $C_2 r$, because the fixed resistor is used. Thus, when the range of the intensity of light is great, the range of variation in the voltage V is made great so that the proper exposure time axactly corresponding to the intensity of light is not obtained due to the variation in the characteristics of the capacitor and the transistor used therewith.

Figure 6:
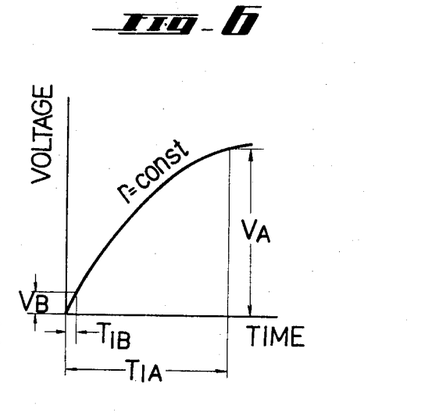
FIG. 6 is a diagram showing the charging characteristics of a capacitor in the memory circuit in which a photoelectric element is incorporated.

In contrast to the above, the memory circuit having a photoelectric element can eliminate the above disadvantage. Referring to FIG. 6, assuming that the resistance of each of photoelectric elements R and $r$ in memory circuit II is $R_A$, $r_A$ under the condition of low intensity of light, respectively, while the above resistance is made $R_B$, $r_B$ under the condition of high intensity of light, respectively, the following relationship is derived from equation (8):

$$R_1/r_1 = R_A/r_A = R_B/r_B = N$$

Therefore, the voltage $V_A$, $V_B$ remains the same to each other regardless of the variation in the intensity of light as seen from the above equation (9):

$$\ln V_0/V_0 - V = N \cdot C_1/C_2 K_1 \quad (9)$$

Assuming that the value of $V$ is $V_K$ when the characteristics of capacitors $C_1$, $C_2$ and $C_3$ are selected appropriately, the values $V_A$, $V_B$ are represented by $$V_A = V_B = V_K$$

This means that capacitor $C_2$ is charged until the voltage of the electric charge reaches the same value regardless of the variation in the charging time period $T_{1A}$, $T_{1B}$ resulting from the low and high intensity of light, thereby permitting the proper exposure time obtained by the provision of the photoelectric element in the memory circuit to be free from the variation in the performance of the capacitor and the transistor. The factor effecting the variation in the voltage $V_A$, $V_B$ is $R/r = N$, and this constant is a fixed value in the same camera and the same objective lens.

In the above description, the capacitor is charged, however, the same effect is obtained when the capacitor is discharged after it has been charged to a predetermined amount.

Also, in the above description, the resistance of the photoelectric element is described as being kept the same during the memorization of the reference time period or during the exposure, however, the same effect is obtained if the resistance of the photoelectric element varies during the memorization or during the exposure, because the substantial factors in obtaining the proper exposure time are the integrated value in terms of the reference time period corresponding to the quantity of light incident to the objective lens and the integrating nature of the capacitors used in the integrating, the memory and the exposure control circuit.

Figure 7:
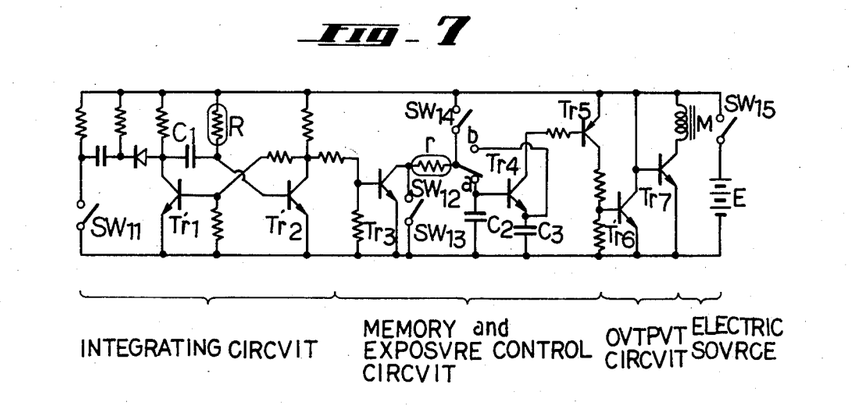
FIG. 7 is a diagram showing the electric circuit of the electronic shutter of FIG. 4.

FIG. 7 shows an embodiment of the electric circuit of FIG. 4. This embodiment is similar to that shown in FIG. 2 except that a monostable circuit consisting of transistors $Tr_1'$, $Tr_2$, is incorporated in the integrating circuit I and photoelectric element $r$ such as CdS cell is used commonly in memory circuit II and exposure control circuit III by switching the connection thereof from the memory circuit to the exposure control circuit by means of switch $SW_{12}$ and that the proper exposure time is obtained by discharging the respective capacitors $C_2$, $C_3$ after they have been charged to predetermined amounts, respectively.

In the initial condition in operation, switch $SW_{11}$ is opened, switch $SW_{12}$ is connected to $a$, switch $SW_{13}$ is opened, switch $SW_{14}$ is closed, and switch $SW_{15}$ is opened, thus no current flowing in the circuit.

By the setting operation of the camera, shutter blade holding means is moved to electromagnet M so that the shutter blades are prevented from being closed. In the first part of the actuation of shutter release means, switch $SW_{15}$ is closed and capacitors $C_2$, $C_3$ are charged through switch $SW_{14}$. Transistor $TR_2'$ is conductive and the base voltage of transistor $Tr_3$, the base of which is connected to the collector of transistor $Tr_2'$, is low, thereby rendering transistor $Tr_3$ to be non-conductive. Transistor $Tr_4$ is rendered to be non-conductive because the capacitors $C_2$, $C_3$ are quickly charged. Therefore, transistor $Tr_5$, the base of which is connected to the collector of transistor $Tr_4$, is made non-conductive so that transistor $Tr_6'$ is rendered to be non-conductive and transistor $Tr_7$ is rendered to be conductive, thereby energizing electromagnet M to arrest the shutter blade holding means so as to keep the shutter blades in the opened state.

The above condition is maintained after switch $SW_{14}$ is opened. By closing switch $SW_{11}$, the monostable circuit formed by transistors $Tr_1'$, $Tr_2'$ is triggered so that transistor $Tr_2'$ is rendered to be non-conductive for the time period determined by $T_1 = K_1 C_1 R_1$. Thus, transistor $Tr_3$ is made conductive for the time period $T_1$ so that the electric charge stored in capacitor $C_2$ is discharged through resistor $r$ having the resistance $r_2$ at that time, and the voltage V of the electric charge remaining in capacitor $C_2$ is determined by the following equation:

$$T_1 = r_2 C_2 \ln V_0/V_0 - V$$

where:
$V_0$ = the voltage of capacitor prior to the discharging thereof.

After lapse of the time period $T_1$, the monostable circuit is returned to the initial state so that transistor $Tr_2'$ is instantaneously rendered to be conductive, thereby rendering transistor $Tr_3$ to be non-conductive. Therefore, the discharging of capacitor $C_2$ is stopped and the reference time $T_1$ is stored in terms of the electric charge remaining in capacitor $C_2$. Of course, the reflecting mirror is kept in the position reflecting the light toward the finder until the memorization of the reference time $T_1$ is completed.

Then, switch $SW_{12}$ is switched to b and, thereafter, switch $SW_{13}$ is closed in coupled relation with the opening of the shutter blades for the exposure of the photosensitive material loaded in the camera by the last part of the operation of the releasing means so that the electric charge in capacitor $C_3$ is discharged through switch $SW_{13}$ and photoelectric element $r$ which is switched to be connected to capacitor $C_3$ and has the resistance $r_3$ at that time. When the voltage of capacitor $C_3$ reaches that of capacitor $C_2$ (strictly speaking, the voltage is somewhat decreased at the point transistor $Tr_4$ is made conductive, such a decrease is compensated for because capacitor $C_3$ has been charged through transistor $Tr_4$).

Thus, transistor $Tr_4$ is rendered to be conductive after the lapse of time T represented by the following equation:

$$T = r_3 C_3 \ln V_0/V_0 - V$$

Therefore, transistors $Tr_5$, $Tr_6'$ are made conductive while transistor $Tr_7$ is rendered to be non-conductive so that electromagnet M is de-energized to release the shutter blade holding means thereby closing the shutter blades.

The exposure time T is represented by $$T = r_3 N + C_1 C_3 / C_2 \, K_1$$

Therefore, by appropriately selecting the characteristics of capacitors $C_1$, $C_2$ and $C_3$, the proper exposure time is obtained in accordance with the intensity of light incident to the objective lens.

Figure 8:
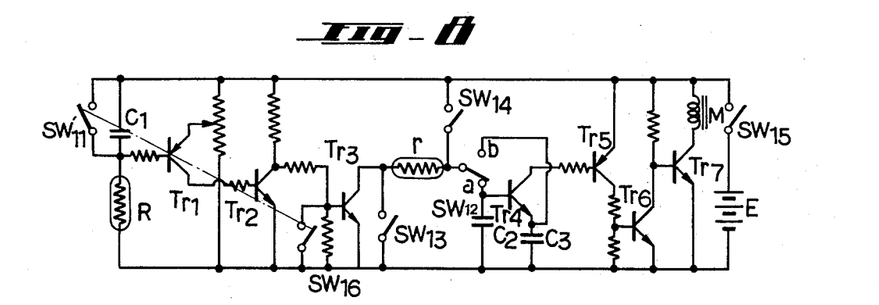
FIG. 8 is a diagram similar to FIG. 7 but showing a modification of the electric circuit of FIG. 7.

FIG. 8 shows a modification of the electric circuit of FIG. 7. The electric circuit of FIG. 8 is similar to that of FIG. 7 except that capacitors $C_2$, $C_3$ are charged for the operation. Switch $SW_{11}'$ is closed, switch $SW_{12}$ is connected to $a$, switch $SW_{13}$ is opened, switch $SW_{14}$ is closed while switch $SW_{15}$ is opened and switch $SW_{16}$ is closed to short-circuit the base and the emitter of transistor $Tr_3$ prior to the operation of the circuit. Switch $SW_{16}$ is coupled with switch $SW_{11}'$ so that they are switched simultaneously.

For the memorization of the reference time $T_1$, switch $SW_{11}'$ is opened together with switch $SW_{16}$ so that capacitor $C_1$ is charged through photoelectric element R for the time $T_1$ given by the following equation:

$$T_1 = R_1 C_1 \ln V_0/V_0 - V''$$

where:
$V_0 =$ the voltage supplied to the circuit
$V'' =$ the voltage applied to the emitter of transistor $Tr_1$ After the lapse of time $T_1$ given above, transistor $Tr_1$ is rendered to be operative. On the other hand, transistor $Tr_3$, which has been made non-conductive by the closure of switch $SW_{16}'$ is rendered to be conductive by the opening of switch $SW_{16}$ simultaneously with the opening of switch $SW_{11}'$ and capacitor $C_2$ is discharged through photoelectric element $r$ having the resistance $r_2$ at that time until transistor $Tr_3$ is rendered to be non-conductive by virtue of transistor $Tr_1$ rendered to be conductive after the lapse of reference time $T_1$, thereby permitting the reference time $T_1$ to be stored in capacitor in terms of the electric charge stored therein.

Since the time required to memorize the reference time $T_1$ has no direct relation to the sensitivity of the photosensitive material, the time constant can be selected to enable the memorization to be effected in a very short time.

Figure 9:
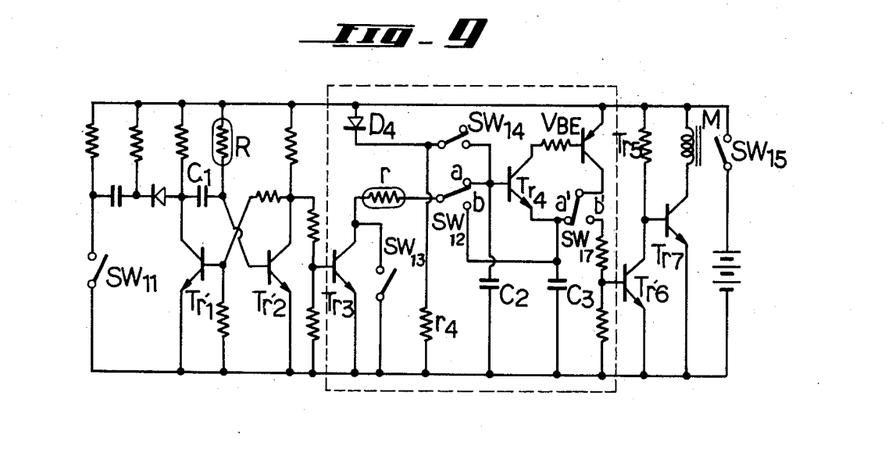
FIG. 9 is a diagram similar to FIG. 7 but showing a further modification of the electric circuit of FIG. 7.

FIG. 9 shows a further modification of the electric circuit of FIG. 7 in which a switch $SW_{17}$ is added in order to permit amplifying transistor $Tr_5$ to be used for charging capacitor $C_3$ by the switching of switch $SW_{17}$, thereby shortening the time required for charging capacitor $C_3$.

In the electric current shown in FIG. 7, capacitors $C_2$ and $C_3$ are charged by the closing of switch $SW_{15}$ and the switching of switch $SW_{14}$ to $a$. However, the charging rate of capacitor $C_3$ is very low because the emitter bias of transistor $Tr_4$ is increasing as the capacitor $C_3$ is being charged so as to decrease the base current thereof. This causes various disadvantages as follows:

1. Comparing the base voltage of transistor $Tr_4$ with the emitter voltage thereof, the base voltage is precedingly made higher than the emitter voltage so that transistor $Tr_4$ is made conductive until the emitter voltage reaches the base voltage, thereby rendering transistor $Tr_7$ to be non-conductive to deenergize electromagnet M so that there might be a danger to release shutter blade holding means prior to the lapse of the proper exposure time. In order to obtain the exact operation of the shutter, a greater time interval between the time transistor $Tr_7$ is made conductive to energize electromagnet M and the time until the shutter blade holding means is positively held in its operative position to maintain the shutter blades in their opened state.

2. It is required to additionally provide some means in the member for closing switch $SW_{14}$ in coupled relation to releasing means in order to maintain the member in the position to close switch $SW_{14}$ for a longer time until the emitter voltage of transistor $Tr_4$ reaches the required value. And, at the same time, a longer time interval from the beginning of the actuation of the release means to the opening of the shutter blades is required, thereby failing the shutter chance.

3. When switch $SW_{14}$ is opened prior to the completion of the charging of capacitor $C_3$ in order to shorten the time period between the actuation of releasing means and the opening of the shutter blades, the control of the exposure time by the circuit of the present invention is apparently impossible.

The electric circuit of FIG. 9 solves the above disadvantages and prevents the occurrence of the unstable operation of the capacitors due to the variation in the supply voltage and the temperature effect on the transistors.

In operation of the circuit of FIG. 9, when switch $SW_{15}$ is closed and switch $SW_{14}$ is closed while switch $SW_{17}$ is switched to $a_1$, transistor $Tr_4$ is made conductive, and, hence, transistor $Tr_5$ is made conductive, therefore, capacitor $C_3$ is charged mainly through transistor $Tr_5$ thereby permitting the charging of capacitor $C_3$ to be instantaneously completed together with the completion of the charging of capacitor $C_2$. When the base current of the transistor $Tr_4$ reaches zero, transistors $Tr_4$, $Tr_5$ are rendered to be non-conductive to terminate the charging of capacitor $C_3$ and the charges in the respective capacitors $C_2$, $C_3$ are maintained after switches $SW_{14}$, $SW_{17}$ are switched so that the steps of the operation prior to the measurement of the light are completed. By closing switch $SW_{11}$, the succeeding steps for the measurement of the light, the memorization of the reference time period, and the exposure control can be carried out in the manner described previously.

Figure 10:
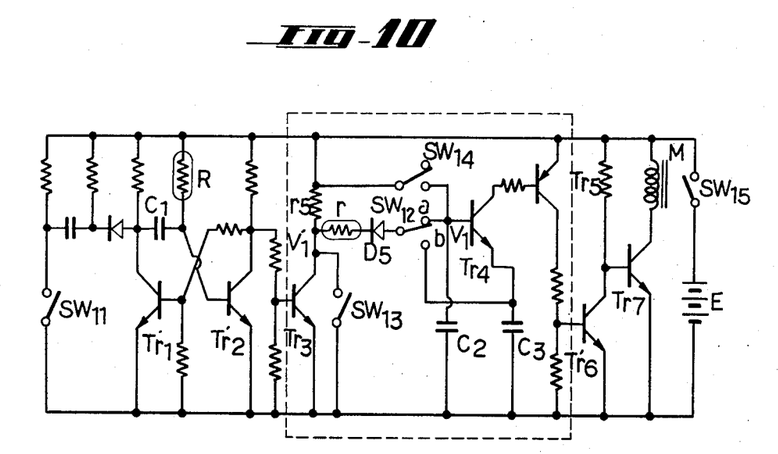
FIG. 10 is a diagram showing a still further modification of the electric circuit of FIG. 7.

FIG. 10 shows a still further embodiment of the electric circuit of the present invention in which the capacitors in the memory and the exposure control circuit are charged to predetermined amounts, respectively, prior to the memorization and the exposure control by the discharging thereof, and in which the electric charge of capacitor $C_2$ of the memory circuit, after it has been charged to a predetermined amount prior to the memorization, is prevented from leaking by the provision of a resistor $r_5$ connected to the collector of transistor $Tr_3$ and switch $SW_{14}$ and a diode $D_5$ connected between photoelectric element $r$ and the movable contact of switch $SW_{12}$.

The leakage of the electric charge of capacitor $C_2$ is harmful for obtaining the proper exposure, because the capacity of capacitor $C_2$ is preferably made small in order to shorten the time required for measuring the intensity of light and improving the accuracy of the proper exposure time by increasing the variation in voltage corresponding to the variation in the intensity of light. The provision of resistor $r_5$ and diode $D_5$ enables the collector voltage of the transistor $Tr_3$ to be equal to the voltage of capacitor $C_2$ during the time transistor $Tr_3$ is made non-conductive so that no leakage or variation in electric charge of capacitor $C_2$ takes place.

In FIG. 10, one end of resistor $r_5$ is connected to the collector of transistor $Tr_3$, and the other end is connected to the movable contact of switch $SW_{14}$, that is, to the supply of the electric power, and the positive terminal of diode $D_5$ is connected to the movable contact of switch $SW_{12}$ and the negative terminal of diode $D_5$ is connected to photoelectric element $r$. Therefore, when transistor $Tr_3$ is non-conductive, voltage $V_1$, of the collector of transistor $Tr_3$ is made equal to voltage $V_1$ of capacitor $C_2$ of the memory circuit through resistor $r_5$. Thus, the electric charge of capacitor $C_2$ does not leak even though switch $SW_{14}$ is opened after capacitors $C_2$, $C_3$ have been charged to predetermined amounts, respectively, so as to be ready for the memorization and the exposure control.

Diode $D_5$ prevents the plus current from flowing to capacitors $C_2$, $C_3$ through resistor $r_5$.

The resistance of resistor $r_5$ is preferably made high so as not to affect the actuation of transistor $Tr_3$ when it is in the conductive condition, i.e., during the memorization.

Figure 11:
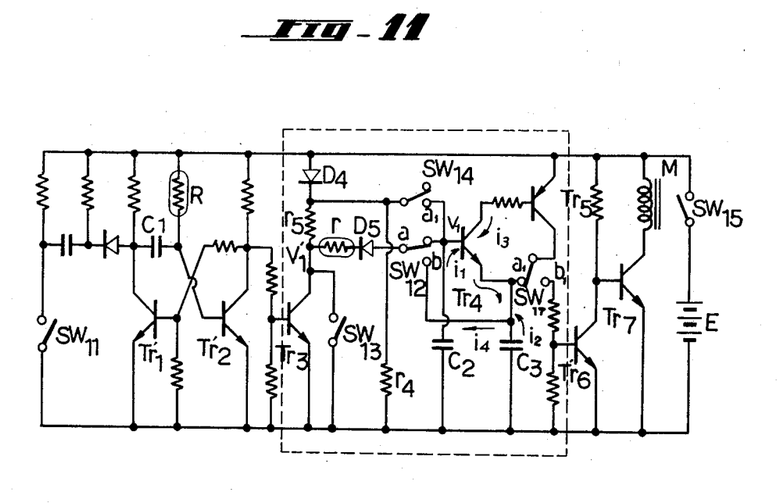
FIG. 11 is a diagram similar to FIG. 10 but showing a modification thereof.

FIG. 11 shows a modification of the electric circuit of FIG. 10. The electric circuit of FIG. 11 is similar to that of FIG. 10 except that switch $SW_{17}$ is added so as to utilize transistor $Tr_5$ for charging capacitor $C_3$ and diode $D_4$ and resistor $r_4$ are added. The performance to prevent the leakage in the electric circuit of FIG. 11 is the same as that of FIG. 10.

Capacitors $C_2$, $C_3$ in FIGS. 10 and 11 are shown as being discharged for the memorization and the exposure control after they have been charged, but they may be used for the memorization and the exposure control by charging them. In this case, one end of each of capacitors $C_2$, $C_3$ is connected to the plus terminal instead of the minus terminal while switch $SW_{14}$ is removed.

Figure 12:
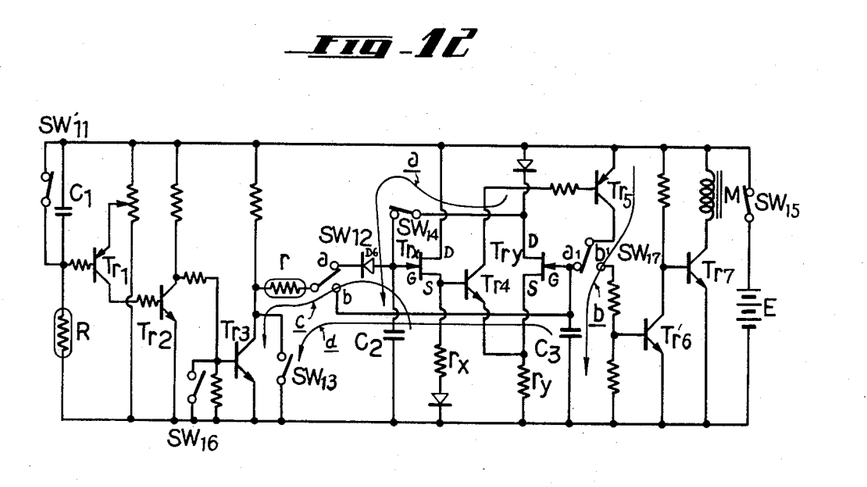
FIG. 12 is a diagram showing the electric circuit of the electronic shutter of the present invention in which field effect transistors are incorporated.

FIG. 12 shows a still further embodiment of the present invention of the discharge type similar to FIG. 10 in which field effect transistors are employed so as to prevent the false function of the exposure control circuit even though the photoelectric element in the exposure control circuit has a high resistance under the low intensity of light.

In the previously described embodiments, transistor $Tr_4$ is rendered to be conductive when the voltage of capacitor $C_3$ is made equal to the voltage of capacitor $C_2$ so that electromagnet M is deenergized for obtaining the proper exposure.

In this case, the emitter of transistor $Tr_4$ has a voltage corresponding to the resistance of photoelectric element $r$ in the exposure control circuit, and, as the resistance becomes higher, the base current of transistor $Tr_4$ decreases and the emitter current is mainly governed by the discharge current of capacitor $C_3$, thereby making it difficult to amplify the collector current of transistor $Tr_4$.

Assuming that the current discharged from capacitor $C_2$ through the base of transistor $Tr_4$ is $i_1$, the current discharged from capacitor $C_3$ is $i_2$, the collector current of transistor $Tr_4$ is $i_3$, the current flowing through photoelectric element $r$ is $i_4$, and the amplifying rate of the current of transistor $Tr_4$ is $\alpha$ (refer to FIG. 11), the following relation exists:

$$i_1/i_2 = C_2/C_3,$$

therefore, $$i_2 = C_3/C_2 \; i_1 \qquad (14)$$

$$i_3 = \alpha i_1 \qquad (15)$$

$$i_4 = i_1 + i_2 + i_3 \qquad (16)$$

From the above equations, $$i_4 = (1 + \alpha + C_3/C_2) \; i_1 \qquad (17)$$

If the value $C_3/C_2$ is selected to be great and the capacity of capacitor $C_2$ is selected to be small, then the current $i_1$ is made very small, and the current amplifying rate of the transistor is made very low. Therefore, the collector current $i_3$ is made smaller than the current $i_4$ flowing through photoelectric element $r$, thereby rendering no amplifying effect to be obtained. Under such a condition, if the resistance of photoelectric element $r$ is made high correspondingly to the low intensity of light, the collector current $i_3$ cannot be amplified by transistor $Tr_5$, the base of which is connected to the collector of transistor $Tr_4$ so that electromagnet M might not be deenergized, thereby making it impossible to terminate the exposure.

Referring to FIG. 12, two field effect transistors Trx, Try are provided in the circuit. Each of the gate G of transistors Trx, Try is supplied with the voltage of the respective capacitor $C_2$, $C_3$, and load resistors $r_x$, $r_y$ are connected to the source of the respective transistor Trx, Try. The drain each of transistors Trx, Try is connected to the plus terminal of electric source E. Thus, the gate voltage each of transistors Trx, Try balances at a voltage slightly lower than the source voltage thereof, and the gate voltage may be considered as the source voltage. Since the source voltage of transistor Trx is determined correspondingly to the voltage of capacitor $C_2$ while the source voltage of transistor Try is determined correspondingly to the voltage of capacitor $C_3$, the source voltage of transistor Try may be compared with the source voltage of transistor Trx by using transistor $Tr_4$ so as to obtain the proper exposure time. In this case, since the base current of transistor $Tr_4$ is not divided by the capacities of capacitors $C_2$, $C_3$, the operation of the circuit is not effected by the value of the resistance of photoelectric element $r$ whether it is high or low.

In operation, switches are set first as shown in FIG. 12 and shutter blade holding means (not shown) is first moved to electromagnet to maintain the shutter blades in the opened state in coupled relation to the setting of the camera. By the first part of the operation of shutter release means, capacitor $C_2$ is charged through switch $SW_{14}$ by the current indicated by $a$, and capacitor $C_3$ is charged through switch $SW_{17}$ by the current indicated by $b$ until the voltage of capacitors $C_2$, $C_3$ reaches $V_0$. At that time, the source voltage of each of transistors Trx, Try is made equal to each other so that transistor $Tr_4$ is rendered to be non-conductive, thereby rendering transistors $Tr_5$, $Tr_6'$ to be non-conductive. Thus, transistor $Tr_7$ is made conductive to energize electromagnet M so as to actuate shutter blade holding means to permit the same to maintain shutter blades in the opened state until electromagnet M is deenergized. The above condition is maintained when switch $SW_{14}$ is opened and switch $SW_{17}$ is switched to $b_1$. By the succeeding portion of the operation of shutter release means, switch $SW_{11}'$ and switch $SW_{16}$ are opened for the memorization of the intensity of light so that capacitor $C_1$ is charged through photoelectric element R having the resistance $R_1$ at this time.

Therefore, transistors $Tr_1$, $Tr_2$ are rendered to be non-conductive so as to render transistor $Tr_3$ to be conductive by the opening of switch $SW_{16}$ during the time period $T_1$ determined by the following equation:

$$T_1 = K_1 R_1 C_1$$

(18)

where:

$$K_1 = \text{constant}$$

Thus, capacitor $C_2$ which has been charged to voltage $V_0$ is discharged as indicated by $c$ through photoelectric element $r$ having the resistance $r_2$ at this time under the intensity of light rendering photoelectric element R to have the resistance $R_1$ until the time period $T_1$ lapses at the end of which transistor $Tr_3$ is rendered to be non-conductive because transistors $Tr_1$, $Tr_2$ are made conductive by the completion of the charging of capacitor $C_1$.

The voltage V of capacitor $C_2$ at the end of the discharging thereof is represented by the following equation:

$$T_1 = r_2 C_2 \ln V_0/V_0 - V$$

(19)

Thus, the reference time period $T_1$ is memorized in terms of the voltage V of the electric charge stored in capacitor $C_2$ at the end of the discharging thereof.

Then, switch $SW_{12}$ is opened prior to the exposure, and, simultaneously with the opening of the shutter blades to arrest them in opened state by the shutter blade holding in opened state, switch $SW_{13}$ is closed so as to discharge capacitor $C_3$ through switch $SW_{13}$ and photoelectric element $r$ having the resistance $r_3$ at the time of the exposure. The time period T during which the voltage of capacitor $C_3$ having the voltage $V_0$ is decreased to voltage V is represented by the following equation:

$$T = r_3 C_3 \ln V_0/V_0 - V$$

(2)

At the time the time period T has lapsed, the gate voltage of field effect transistor Trx is V and the gate voltage of field effect transistor Try also decreases to voltage V and hence, the source voltage thereof also decreases so that, when the emitter voltage of transistor $Tr_4$ connected to the source of transistor Try is lowered in comparison with the base voltage of transistor $Tr_4$ connected to the source of transistor Trx, transistor $Tr_4$ is rendered to be conductive, thereby rendering transistors $Tr_5$, $Tr_6'$ to be conductive while transistor $Tr_7$ is made non-conductive to deenergize electromagnet M so as to release the shutter blade holding means to close the shutter blades.

The exposure time T is represented by the following equation:

$$T = r_3 (R_1/r_2)(C_1 C_3/C_2) K_1$$

(21)

This means that the proper exposure time is obtained in accordance with the intensity of light by the electric circuit of FIG. 12.

The electric circuit of FIG. 12 makes it possible to obtain the proper exposure time without fail even though the intensity of light is very low resulting in a very high resistance of the photoelectric elements.

Figure 13:
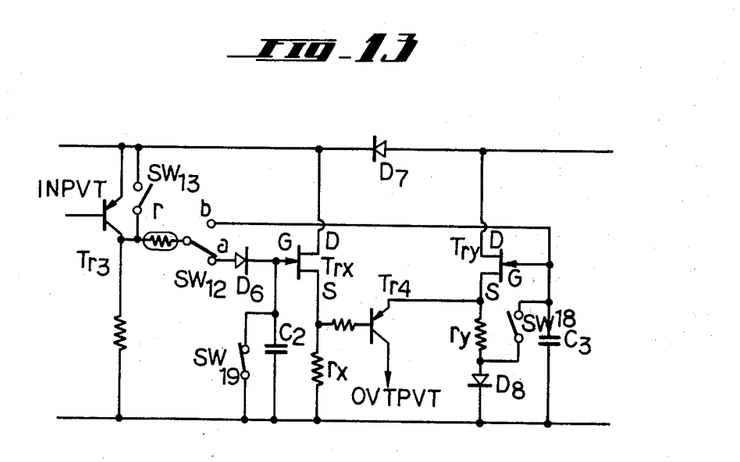
FIG. 13 is a diagram showing the main part of a modification of the electric circuit of FIG. 12.

FIG. 13 shows a modification of the electric circuit of FIG. 12. This circuit is constructed as the charging type in which the capacitors $C_2$, $C_3$ are charged for the memorization and the exposure control similar to those previously described.

In operation, capacitors $C_2$, $C_3$ are initially discharged by switches $SW_{18}$, $SW_{19}$ prior to the memorization and the exposure control. The operation of the circuit will be clear from the previous description.

What is claimed is:

1. Method for automatically determining the proper exposure time of an electronic shutter incorporated in a photographic camera in which the light from an object is measured for controlling the exposure time after it passes through an objective lens of said camera, wherein the improvement comprises the steps of electrically charting a capacitor in an integrating circuit including a photoelectric element connected to said capacitor and adapted to receive the light from the object after passing through the objective lens so that the resistance of said photoelectric element is varied in accordance with the intensity of the light incident thereto, thereby permitting said capacitor to be charged at a rate determined by said varied resistance of said photoelectric element to determine a reference time period indicative of the intensity of the light incident to the objective lens, actuating a capacitor in a memory circuit connected to said integrating circuit through a photoelectric element incorporated therein and adapted to receive the light from the object directly without passing through said objective lens so that the rate of actuation of said capacitor varies correspondingly to that of said capacitor in said integrating circuit, said photoelectric element being connected to said capacitor in said memory circuit for said reference time period simultaneously with the charging of said capacitor in said integrating circuit so as to store an electric charge in said capacitor in said memory circuit prior to opening of the shutter blades the voltage of which is indicative of said reference time period, actuating a capacitor in an exposure control circuit connected to said memory circuit through a photoelectric element incorporated therein, said element being connected to said capacitor in said exposure control circuit simultaneously with the opening of shutter blades of said electronic shutter so that the voltage of the electric charge in said capacitor is varied as the same is actuated, said photoelectric element receiving light from the object directly without passing through said objective lens so that the rate of actuation of said capacitor in said exposure control circuit is varied in accordance with the intensity of the light incident thereto, thereby permitting the proper exposure time to be obtained regardless of the variation in the intensity of the light after the shutter blades are opened, while said memory circuit is operable over a wide range of variation in the intensity of the light by virtue of said photoelectric element through which said capacitor in said memory circuit is actuated, comparing the varying voltage of said capacitor in said exposure control circuit with that of said capacitor in said memory circuit, and actuating a switching circuit connected to said exposure control circuit when the voltage of said capacitor in said exposure control circuit reaches the voltage of the electric charge stored in said capacitor in said memory circuit so as to actuate shutter blade closing means in said electronic shutter connected to said switching circuit thereby permitting the shutter blades to be closed for the proper exposure.

2. Method according to claim 1, wherein said photoelectric element in said memory circuit is commonly used in said exposure control circuit by switching the connection thereof from said memory circuit to said exposure control circuit simultaneously with the actuation of said capacitor in said exposure control circuit.

3. Electronic shutter for use in a photographic camera in which the light from an object is measured for controlling the exposure time of said shutter after it passes through an objective lens of said camera, said shutter having an electric source, shutter blade closing means for closing shutter blades of said shutter after the same are opened by the actuation of shutter releasing means in said camera, said shutter means being operative in two parts, wherein the improvement comprises an integrating circuit comprising a capacitor and a photoelectric element connected thereto and adapted to receive the light from the object after passing through the objective lens so as to charge said capacitor by said electric source through said photoelectric element by the first part of the actuation of said releasing means at a rate determined by the resistance of said photoelectric element which is varied in accordance with the intensity of the light incident to said photoelectric element so that a reference time period is set in said integrating circuit which is indicative of the intensity of the light by the charging of said capacitor at said rate, a memory circuit connected to said integrating circuit and comprising a capacitor and a photoelectric element connected thereto so as to actuate said capacitor through said photoelectric element simultaneously with the charging of said capacitor in said integrating circuit for said reference time period given by said integrating circuit so that an electric charge is stored in said capacitor the voltage of which is indicative of said reference time period, said photoelectric element being adapted to receive the light from the object directly without passing through the objective lens so that the resistance thereof is varied correspondingly to that of said photoelectric element in said integrating circuit thereby permitting said memory circuit to be operable over a wide range of variation in the intensity of the light incident thereto, an exposure control circuit connected to said memory circuit and comprising a capacitor and a photoelectric element connected thereto so as to actuate said capacitor through said photoelectric element simultaneously with the opening of the shutter blades effected by the last part of the operation of said releasing means so that the voltage of the electric charge in said capacitor is varied and a switching circuit connected to said shutter blade closing means, said photoelectric element being adapted to receive the light from the object directly without passing through the objective lens so that the resistance thereof is varied in accordance with the intensity of the light incident thereto, thereby permitting the proper exposure time to be obtained regardless of the variation in the intensity of the light after the shutter blades are opened for the exposure, means for actuating said memory circuit and said exposure control circuit when the voltage of said capacitor in said exposure control circuit reaches that of said capacitor in said memory circuit so as to actuate said shutter blade closing means for closing the shutter blades for the proper exposure.

4. Electronic shutter according to claim 3, wherein said photoelectric element in said memory circuit is commonly used in said exposure control circuit by switching the connection thereof from said memory circuit to said exposure control circuit simultaneously with the actuation of said capacitor in said exposure control circuit by the last part of the operation of said releasing means.

5. Electronic shutter according to claim 3, wherein said capacitor in said memory circuit is discharged simultaneously with the charging of said capacitor in said integrating circuit after it has been charged by said electric source to a predetermined amount while said capacitor in said exposure control circuit is discharged simultaneously with the opening of the shutter blades after it has been charged by said electric source to a predetermined amount, and said exposure control circuit includes a transistor amplifying circuit and a switch is provided therein which is connectable to said capacitor in said exposure control circuit to said transistor amplifying circuit thereby permitting said capacitor to be charged through said transistor amplifying circuit prior to the opening of the shutter blades.

6. Electronic shutter according to claim 3, wherein said capacitor in said memory circuit is discharged simultaneously with the charging of said capacitor in said integrating circuit after it has been charged by said electric source to a predetermined amount while said capacitor in said exposure control circuit is discharged simultaneously with the opening of the shutter blades after it has been charged by said electric source to a predetermined amount, and said memory circuit includes an input transistor for triggering said memory circuit by means of said integrating circuit with the base of said transistor being connected to said integrating circuit while the collector thereof is connected to said capacitor in said memory circuit through said photoelectric element and the emitter is connected to the minus terminal of said electric source, and a resistor is provided between the collector of the transistor and the plus terminal of said electric source so as to apply to the collector a predetermined voltage thereby making the voltage of said capacitor equal to that of said transistor while the same is rendered inoperative to prevent the leakage of said capacitor, a diode being provided in parallel to said photoelectric element to prevent the current flowing in the reverse direction through said resistor.

7. Electronic shutter according to claim 3, wherein the improvement comprises the fact that said resistor in said memory circuit is a photoelectric element adapted to receive the light from the object directly without passing through the objective lens so that the resistance thereof is varied correspondingly to that of said photoelectric element in said integrating circuit thereby permitting said memory circuit to be operable over a wide range of variation in the intensity of the light incident thereto while said resistor in said exposure control circuit is a photoelectric element adapted to receive the light from the object directly without passing through the objective lens so that the resistance thereof is varied in accordance with the intensity of the light incident thereto, thereby permitting the proper exposure time to be obtained regardless of the variation in the intensity of the light after the shutter blades are opened for the exposure, and wherein a field effect transistor is provided in said memory circuit with the gate thereof connected to one end of said capacitor therein and with the source thereof connected to the minus terminal of said electric source through a load resistor while the drain thereof is connected to the plus terminal of said electric source so as to render the source voltage equal to that of said capacitor while a second field effect transistor is provided in said exposure control circuit with the gate thereof connected to one end of said capacitor therein and with the source thereof connected to the minus terminal of said electric source through a load resistor while the drain thereof is connected to the plus terminal of said electric source so as to render the source voltage of the second field effect transistor equal to that of said capacitor, the source voltage of said transistor in said exposure control circuit being compared with that of said transistor in said memory circuit thereby permitting said switching circuit to be positively actuated regardless of variations in the resistance of each of said photoelectric elements in said memory circuit and said exposure control circuit.

* * * * *